United States Patent [19]

Hench et al.

[11] Patent Number: 4,804,731
[45] Date of Patent: Feb. 14, 1989

[54] METHOD FOR CROSSLINKING OF POLYSILASTYRENE

[75] Inventors: Larry L. Hench; Burtrand I. Lee, both of Gainesville, Fla.

[73] Assignee: University of Florida Research Foundation, Inc., Alachua, Fla.

[21] Appl. No.: 704,939

[22] Filed: Feb. 25, 1985

[51] Int. Cl.$^4$ ............................................. C08G 77/38
[52] U.S. Cl. ...................................... 528/24; 264/36; 427/397.7
[58] Field of Search ................................. 528/24, 901; 260/DIG. 31; 556/430; 522/148

[56] References Cited

U.S. PATENT DOCUMENTS

| 3,546,156 | 12/1970 | Baronnier et al. | 528/24 X |
| 3,876,605 | 4/1975 | Itoh et al. | 528/24 X |
| 4,310,651 | 1/1982 | Baney et al. | 556/430 X |
| 4,324,901 | 4/1982 | West et al. | 556/430 |

FOREIGN PATENT DOCUMENTS 0215426 12/1983 Japan .................................. 522/148

OTHER PUBLICATIONS

L. D. David, "New Polysilane Polymers: Polysilastyrene and Polyphenylmethylisilylene," University Wisconsin—Madison 1981.

Chapter 19 by Robert West entitled "Polysilane Precursors to Silicon Carbide."

*Primary Examiner*—Richard D. Lovering
*Attorney, Agent, or Firm*—Finnegan, Henderson, Farabow, Garrett & Dunner

[57] ABSTRACT

Crosslinking polysilastyrene by mixing polysilastyrene with 2-15 weight % dicumyl peroxide and heating at 80° C. to 500° C. for 5 minutes to 5 days to produce crosslinking.

8 Claims, No Drawings

METHOD FOR CROSSLINKING OF POLYSILASTYRENE

This invention was made with Government support under F49620-83-C-0072 awarded by the Air Force. The Government has certain rights in this invention.

BACKGROUND OF THE INVENTION

This invention relates to a novel method for crosslinking of polysilastyrene and then pyrolyzing to produce SiC material.

DESCRIPTION OF THE PRIOR ART

An easier and more convenient processing method to produce silicon carbide (SiC) in various forms; fibers, whiskers, powder, etc., is desirable for engineering applications such as reinforcement of metals, ceramics, or polymer materials in composites.

It has been discovered that polysilastyrene as a starting material is superior to polycarbosilane from which commercially available βSiC Nicalon fiber (Nippon Carbon Co., Japan) is made (Yajima process). The advantages of the present invention are achieved by crosslinking polysilastyrene quite easily to achieve dimensional stability of the formed body and to produce a higher char yield of SiC upon pyrolysis. Hence, the discovery of the present invention of a way to crosslink polysilastyrene leads to lower cost and a superior SiC in terms of purity, mechanical properties, thermal properties, and fabricability.

SUMMARY OF THE INVENTION

By the present invention, there is provided a novel method to crosslink polysilastyrene (PSS) using dicumyl peroxide (DCP) as the initiator. The method generally comprises adding the DCP to PSS under controlled temperature, viscosity and ambient conditions to achieve the desired crosslinking. The resulting crosslinked PSS is then heated and pyrolyzed up to 1200° C. to char and decompose to β-SiC.

DETAILED DESCRIPTION OF THE INVENTION

The method of the present invention comprises heating a quantity of PSS to the molten state while degassing using a vacuum and flushing with an inert gas such as argon. Then, a solvent, e.g., toluene, containing about 2–15 weight percent DCP based on the weight of the PSS in solution (preferably 5–10 weight %) is added to the degassed PSS. The mixture is heated up to about 80°–500° C., preferably 100°–300° C., optimally about 200° C. for about one hour to achieve crosslinking of the PSS. The heating can be from a few minutes (5 minutes) to 5 days, but preferably takes from 30 minutes to 12 hours. The resultant crosslinked PSS is then pyrolyzed at a temperature up to 1200° C. for more than twenty (20) minutes, preferably sixty (60) to one hundred twenty (120) minutes to obtain the β-SiC.

The viscosity of the PSS can be adjusted by varying the amount of solvent. Thus, for use in infiltration of composites it is desirable to have a low viscosity PSS. This requires from 20 to 50 ml of toluene solvent to 5 g of PSS. Lesser amounts of solvent are difficult to mix with DCP.

The amount of DCP added to PSS affects the degree of crosslinking, i.e. a larger amount of DCP produces a greater degree of crosslinking. A greater degree of crosslinking results in a harder and more brittle crosslinked polysilastyrene (X-PSS). However, the optimum range of DCP is 5–10 weight percent in PSS.

Heating rate and vacuum level can be varied as long as the PSS mix is not splashed. A higher temperature will shorten the crosslinking reaction time. A lower temperature, although requiring a longer reaction time, is beneficial for higher dimensional stability in monoliths.

Since PSS is ultraviolet sensitive, any UV and/or fluorescent light should be kept to a minimum by covering the reaction vessels throughout the reaction or by carrying out the reaction in rooms with low red lights.

The crosslinked PSS (X-PSS) appeared as a yellowish translucent solid (uncrosslinked PSS has very light yellowish-green color or is colorless) which was insoluble in benzene and acetone and did not fuse upon heating up to 200° C. At temperatures about 200° C., the polymer began charring and undergoing decomposition of SiC.

TGA analysis up to 1100° C. in nitrogen showed 50–55% weight residue of SiC plus some $SiO_2$. The char yield appeared to be a function of the degree of crosslinking and the amount of DCP.

Using the method of the present invention, crosslinking and pyrolysis can be carried out in-situ in vacuum, in an inert atmosphere such as Ar or in a controlled low partial pressure of $O_2$ under controlled temperature and time conditions.

When the crosslinked PSS is pyrolyzed in $N_2$ at 1065° C. for 60 minutes, there appears a black monolith with a greenish luster on the surface. Fourier Transform Infrared spectrophotometer and X-ray diffractometer have shown that β-SiC was formed with a small amount of silica on the surface of the β-SiC monolith.

The following is the probable mechanism of the crosslinking reaction by DCP.

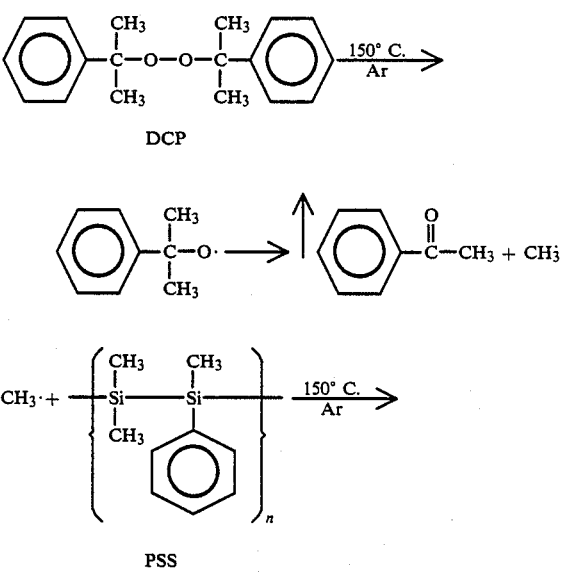

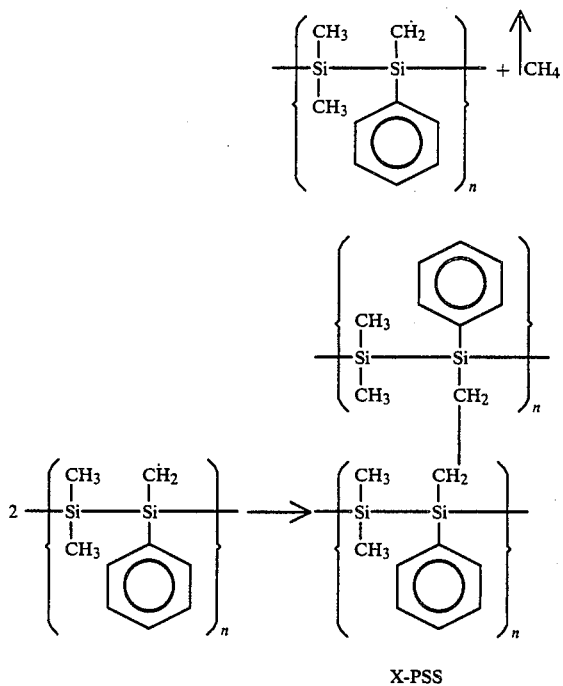

X-PSS

The invention may be further understood and appreciated from the following specific examples.

EXAMPLE 1

5 g of solid PSS were placed in a 25 ml glass test tube and connected to a vacuum line through a one holed rubber stopper and a stopcock. The PSS was degassed at a vacuum level of $1 \times 10^{-2}$ torr as the PSS in the tube heated slowly to a molten state at about 150° C. using a controlled heating plate. Degassing was continued at about 150° C. for 10 minutes or longer until no visible bubbling from the molten PSS were seen. The vacuum level was maintained and the test tube containing PSS was cooled to room temperature. About 50 ml of the solvent, toluene, was degassed by purging with Ar for 10 minutes. A dicumyl peroxide solution was prepared by dissolving 5 g of dicumyl peroxide (DCP) in the Ar purged toluene to make up about a 10 weight percent solution. The evacuated PSS tube was opened and 5 ml of DCP solution was added and mixed well with the PSS using a spatula until the mixture became homogeneous. The vacuum line was connected and evacuation effected as the tube slowly heated. Gradually, over a 5 minute period the stopcock was opened thereby increasing the vacuum applied as the tube heated from room temperature until 200° C. The mixture in the tube was heated at about 200° C. for approximately 1 hour while maintaining the vacuum (less than $1 \times 10^{-2}$ torr). At this stage the crosslinking reaction was maintained until the PSS became quiescent. Typically, the time for the crosslinking reaction is approximately one hour. The heating plate was turned off and the reaction tube cooled to room temperature during 15 minutes. The tube contained a hard brittle translucent yellowish solid, the crosslinked PSS (X-PSS). The extent of crosslinking is controlled by the time heating was effected at 200° C. One hour provides maximum crosslinking for the amount of DCP initiator used in this example.

EXAMPLE 2

The same procedure used in example 1 was followed up to connection of the vacuum line and evacuation. Then, evacuation was stopped and the reaction tube sealed by closing the stop-cock. The vacuum line was disconnected. The sealed reaction tube was placed in an oven at about 150° C. for 10 hours for curing. The reaction tube was removed from the oven and cooled to room temperature. The yellowish hard brittle translucent solid in the tube was X-PSS. The extent of crosslinking in this example is controlled by the curing time. The 10 hour curing time is maximum for the amount of initiator used in this example.

EXAMPLE 3

Degassing was done by flushing with Ar gas instead of a vacuum pump. 5 g of solid PSS were placed in a 25 ml glass test tube, and Ar gas introduced through a glass blower tip over the PSS in the tube as the tube was heated slowly to a temperature up to about 150° C. The molten PSS was flushed for 10 minutes with Ar at the rate of 200 ml per minute. 5 ml of DCP solution prepared as in Example 1 were added, and the molten PSS and DCP solution were mixed under Ar flow with continued heating at 150° C. and continued Ar flushing for 5 hours. By the end of about 5 hours, the semiliquid PSS mix became a yellowish translucent solid, X-PSS. The extent of crosslinking in this example is controlled by the length of heating. Five hours gave maximum crosslinking for the amount of DCP used.

EXAMPLE 4

The cross linking reaction is carried out in a closed system by placing 5 g of PSS in a conventional laboratory 200 ml 3-neck round bottom flask. 50 ml of benzene containing 5 g DCP are added with a magnetic stirrer bar. An argon gas supply is connected to one side neck, a thermometer is inserted into the other side neck and a glass condenser is connected to the upright, middle neck through ground joints. Cold water is contained to flow through tube of the condenser, the central tube of which serves as the argon exhaust. The flask is flushed with argon for 5 hours with gentle stirring to degas. The flask is placed on a heating mantle and magnetic stirrer. Argon flushing is continued and the temperature is raised to the boiling point of the solvent, about 100° C. for benzene or 110° C. for toluene, and refluxing commenced and continued for 12 hours with vigorous stirring and moderate refluxing. After 12 hours, the temperature is decreased to 20° C. The solution appears brownish orange in color and is poured into warm methanol with stirring to precipitate the crosslinked PSS. The X-PSS is washed with methanol, is washed on a suction filter and dried. The X-PSS is then pyrolyzed as in Example 1 to obtain SiC.

EXAMPLE 5

Example 4 was repeated using 5 g of the oligomer of PSS and toluene as the solvent. SiC was obtained as in Example 4.

To obtain SiC fibers, according to the present invention, DCP (with solvent) is added to the PSS polymer or oligomer and then spun to obtain fibers. The material can be spun through a conventional spinneret into a cold inert atmosphere of argon or $N_2$ and then crosslinked by heating as in the preceding Examples and finally pyrolyzed.

The Examples 1-5, as already noted, can be applied to silastyrene oligomer to repolymerize and crosslink. This is beneficial as 50% or more of the yield in PSS synthesis is the oligomer. It is believed that no repolymerization methods are heretofore known.

The ability to induce polymerization and achieve crosslinking of the oligomer of polysilastyrene makes it possible to impregnate microporous solids, such as gels, monoliths and composites with the oligomer liquid plus DCP and polymerize and crosslink in the pores, in situ. Heating of the crosslinked material (pyrolyzing) in the pores yields a SiC coating and filling of the pores of the microporous solid thereby increasing the strength and other physical properties of the structure. Such microporous solids include graphite-carbon composites, carbon-carbon composites, graphite-SiC composites, and $SiO_2$ or $SiO_2$-SiC gels, monoliths and composites.

By the present invention one can also strengthen joints or repair cracks by soaking with the oligomer liquid plus DCP, crosslinking and pyrolyzing. Also, it is possible to use pressure impregnation for microporous solids, joints or cracks to overfill to ensure a better filling with the SiC.

Having described the invention in detail, changes and modification will be obvious to those skilled in the art which do not depart from the spirit or scope of the invention as set forth herein.

What is claimed is:

1. A method for crosslinking polysilastyrene comprising mixing polysilastyrene with dicumyl peroxide and heating to produce crosslinking.
2. The method of claim 1 wherein the heating is effected from about 80° C. to about 500° C.
3. The method of claim 1 wherein the heating is effected from about 100° C. to about 300° C.
4. The method of claim 3 wherein the heating is effected at about 200° C.
5. The method of claim 1, wherein the dicumyl peroxide is present from about 2 to about 15 weight % based on the polysilastyrene.
6. The method of claim 5 wherein the heating is effected from about 80° to about 500° C. for a time from about 5 minutes to about 5 days.
7. The method of claim 1 wherein the weight % of dicumyl peroxide is from about 5 to about 10.
8. The method of claim 1 wherein the polysilastyrene is in the form of the polymer or the oligomer.

* * * * *